(12) United States Patent
Nishio et al.

(10) Patent No.: US 6,719,589 B2
(45) Date of Patent: Apr. 13, 2004

(54) MEMORY CARD CONNECTOR HAVING A LOCKING MECHANISM

(75) Inventors: Atsushi Nishio, Mito (JP); Takashi Kawasaki, Mito (JP); Isao Suzuki, Mito (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/238,450

(22) Filed: Sep. 10, 2002

(65) Prior Publication Data
US 2003/0049969 A1 Mar. 13, 2003

(30) Foreign Application Priority Data
Sep. 12, 2001 (JP) .......................................... 2001-276784

(51) Int. Cl.[7] .............................................. H01R 24/00
(52) U.S. Cl. ...................... 439/630; 439/159; 439/160; 439/157
(58) Field of Search ................................ 439/630, 607, 439/609, 159, 567, 946, 327, 924.1, 862, 83, 876, 637, 60, 79, 153, 152, 160, 157, 489

(56) References Cited

U.S. PATENT DOCUMENTS 6,270,365 B1 * 8/2001 Nishioka ..................... 439/159
6,319,029 B2 * 11/2001 Nishioka ..................... 439/159
6,338,636 B2 * 1/2002 Nishioka ..................... 439/157
6,399,906 B1 * 6/2002 Sato et al. ................... 439/489
6,488,528 B2 * 12/2002 Nishioka ..................... 439/489
6,503,092 B1 * 1/2003 Sato ............................ 439/159
6,547,601 B2 * 4/2003 Oguchi ....................... 439/630

FOREIGN PATENT DOCUMENTS

JP      10320511      12/1998
JP      2000 251024    9/2000

OTHER PUBLICATIONS

Koroda (US 2003/0013336); Card connector apparatus capable of receiving different kinds of cards. Jan. 16, 2003.*

* cited by examiner

Primary Examiner—Dean A. Reichard
Assistant Examiner—Angel R Estrada
(74) Attorney, Agent, or Firm—Ladas & Parry

(57) ABSTRACT

When a memory card is inserted into a housing of a memory card connector, a terminal of the memory card contacts a contact terminal so formed as to extend in an inserting direction in the housing. When the memory card reaches a mounting position, a locking mechanism locks the memory card at the mounting position by engaging with a side recess of the memory card.

2 Claims, 18 Drawing Sheets

STATE PRIOR TO INSERTING MEMORY CARD

MAGNIFICATION VIEW OF PART D

MOMERY CARD INSERTION STATE

MEMORY CARD MOUNT STATE

MEMORY CARD MAXIMUM
PRESSED-IN STATE
(EJECTION STATE)

MEMORY CARD CONNECTOR HAVING A LOCKING MECHANISM

BACKGROUND OF THE INVENTION

1. Field of the Invention

The present invention generally relates to a memory card connector, and more particularly, to a memory card connector structured so as to hold an inserted memory card at a mounting position.

2. Description of the Related Art

A memory card incorporating a semiconductor memory (a RAM) has been developed as a recording medium storing image data taken by a digital camera, or a recording medium storing music digital data replayed by a portable music player, for example.

In a memory card of this type, a semiconductor memory (a RAM) is housed inside a package having an appearance formed in a thin-plate shape, and a plurality of electrically connected terminals are arranged at an end of the package.

Additionally, memory cards are formed in dimensions and shapes determined according to individual types thereof. Therefore, a digital camera or a portable music player needs to be provided with a memory card connector corresponding to the dimensions and shape of a memory card to be used therein.

As disclosed for example in Japanese Laid-Open Patent Application No. 10-320511 and Japanese Laid-Open Patent Application No. 2000-251024, a conventional memory card connector has a structure in which a side of a memory card is pressed and held by an inner pressing mechanism when the memory card is inserted, in which structure the memory card is extractable.

However, since such conventional memory card connector as above cannot surely hold a memory card inserted in a card holder, there has been a risk that the inserted memory card may jump out when an impact is applied from the exterior. To prevent this, such conventional memory card connector has had to comprise a shutter shutting a card insertion slot into which the memory card is inserted so as to prevent the inserted memory card from jumping out by closing this shutter.

Therefore, there have been problems that the conventional memory card connector is difficult to downsize to the extent that the shutter has to be provided in addition, and that the number of components provided for the conventional memory card connector becomes larger so as to increase a manufacturing cost thereof.

SUMMARY OF THE INVENTION

It is a general object of the present invention to provide an improved and useful memory card connector in which the above-mentioned problems are eliminated.

A more specific object of the present invention is to provide a memory card connector which prevents an mounted memory card from coming off or being pulled out.

In order to achieve the above-mentioned objects, there is provided according to one aspect of the present invention a memory card connector comprising a housing forming an insertion part into which a memory card is inserted, a contact terminal formed long in an inserting direction in the housing so as to contact a terminal of the memory card; and a locking mechanism locking the memory card at a predetermined mounting position by engaging with a side recess of the memory card when the memory card is inserted into the insertion part and reaches a vicinity of the mounting position.

According to the present invention, the memory card inserted into the mounting position in the housing can be prevented from coming off or being pulled out. Additionally, the memory card can be locked upon the memory card reaching the mounting position in the housing; therefore, in the course of the memory card being inserted, the memory card is not subjected to any excessive load; thus, the memory card can be inserted smoothly, and can be prevented from being damaged by the locking mechanism.

Additionally, in the memory card connector according to the present invention, the locking mechanism may comprise a locking member changing position to a locking position so as to engage with the side recess of the memory card when the memory card is inserted into the insertion part and reaches the vicinity of the mounting position, and a sliding member supporting the locking member so as to cause the locking member to engage with the side recess of the memory card, and including a contact portion contacting on an inserting end of the memory card so as to be pressed in the inserting direction.

According to the present invention, the locking member locks or unlocks the memory card in accordance with a sliding position of the sliding member moving in contact with the memory card; therefore, when a sliding position of the memory card equals the mounting position, the locking member surely locks the memory card so as to prevent the memory card from coming off or being pulled out.

Additionally, in the memory card connector according to the present invention, the housing may comprise an unlocking guide portion causing the locking member to change position to an unlocking position according to a sliding movement of the sliding member by the memory card moving further in the inserting direction from the mounting position.

According to the present invention, the locking member is caused to change position to the unlocking position in accordance with an ejecting operation of the memory card; and, the memory card becomes extractable when the memory card is ejected a predetermined distance from the mounting position.

Additionally, in the memory card connector according to the present invention, the locking member may comprise an engaging portion contacting on a contact surface of the side recess by so inclining with respect to the contact surface as to bite thereinto.

According to the present invention, the side recess of the memory card is surely locked so as to prevent the memory card from coming off or being pulled out.

Other objects, features and advantages of the present invention will become more apparent from the following detailed description when read in conjunction with the accompanying drawings.

DETAILED DESCRIPTION OF THE PREFERRED EMBODIMENTS

A description will now be given, with reference to the drawings, of embodiments according to the present invention.

Figures 1A, 1B:
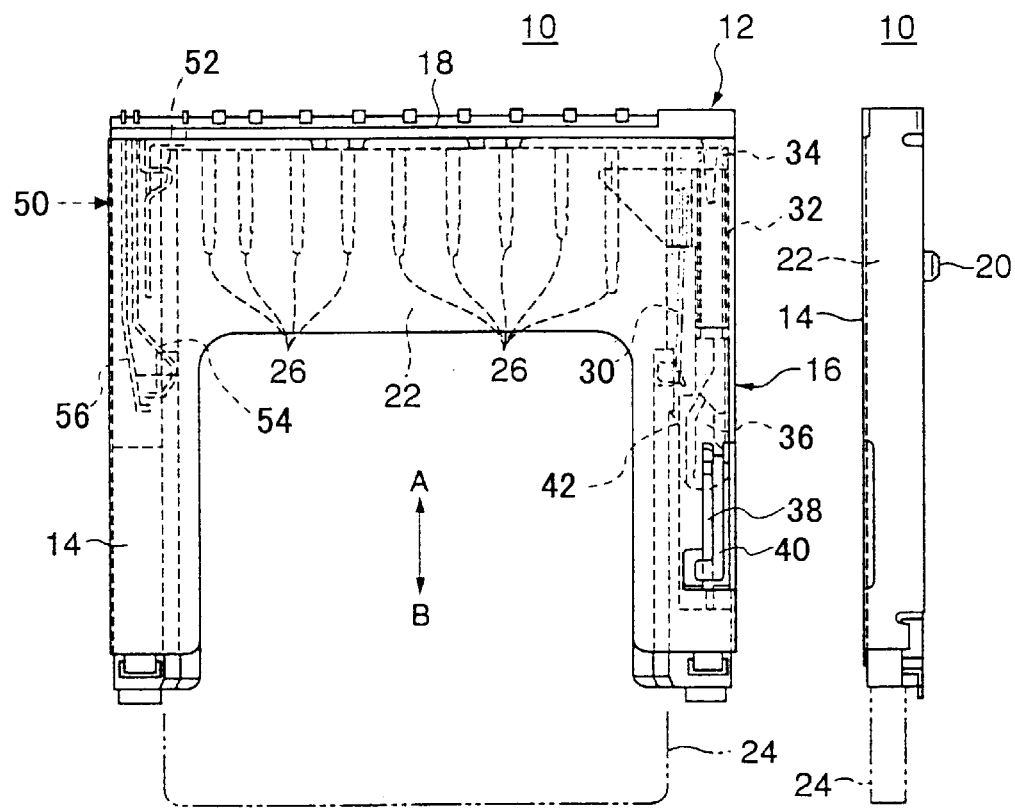
FIG. 1A is a plan view of a memory card connector according to an embodiment of the present invention.
FIG. 1B is a side view of the memory card connector.
Figure 1C:
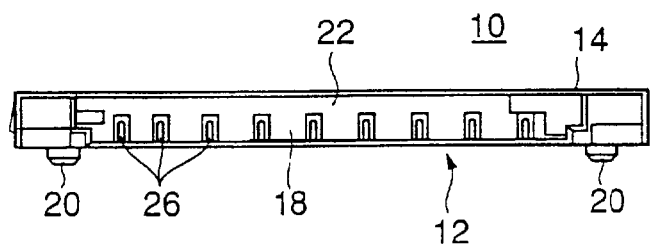
FIG. 1C is a front view of the memory card connector.
Figure 2:
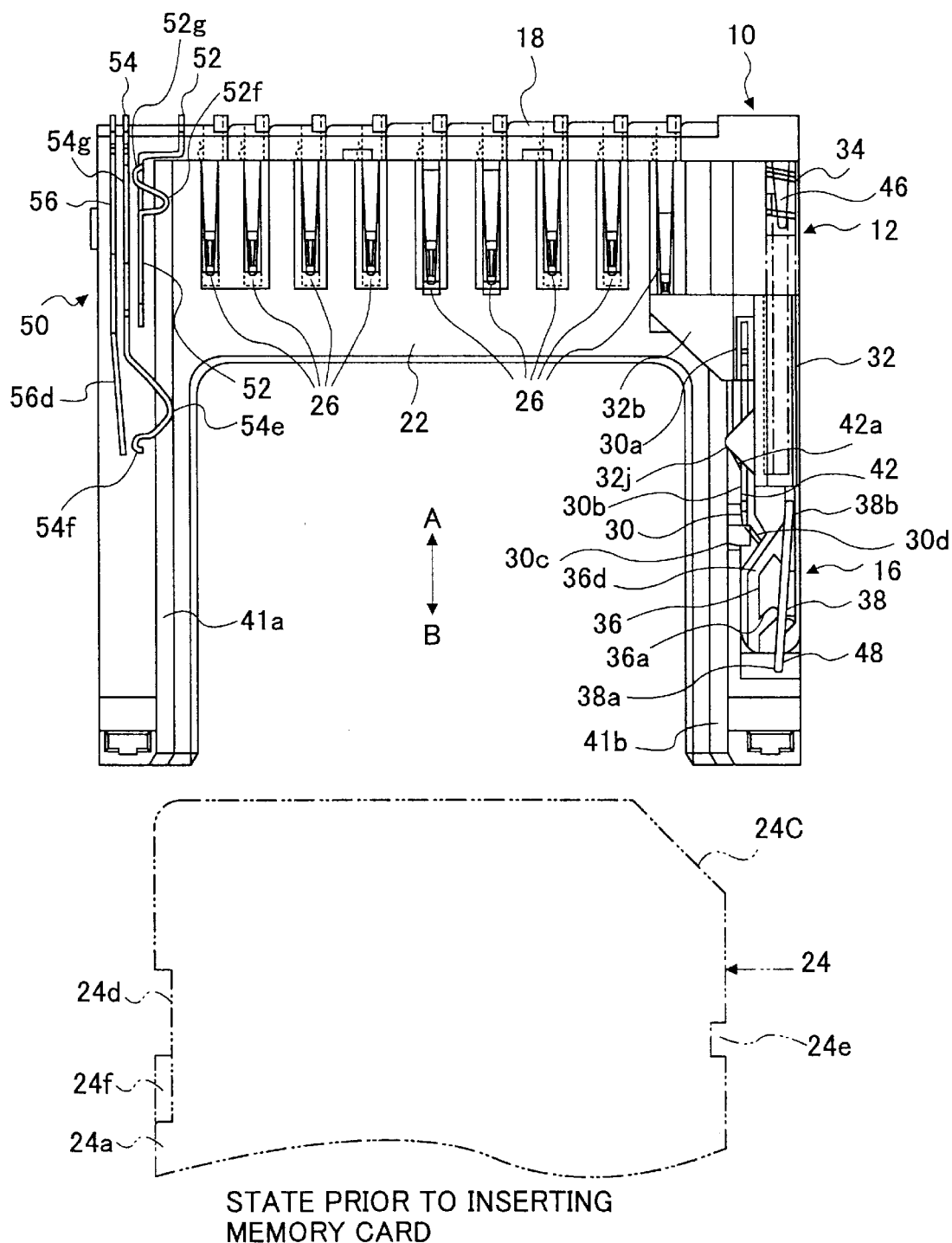
FIG. 2 is a plan view of the memory card connector with a plate removed in a state prior to inserting a memory card.

FIG. 1A to FIG. 1C illustrate a memory card connector according to an embodiment of the present invention. FIG. 1A is a plan view of the memory card connector. FIG. 1B is a side view of the memory card connector. FIG. 1C is a front view of the memory card connector. FIG. 2 is a plan view of the memory card connector with a plate removed in a state prior to inserting a memory card.

As shown in FIG. 1A to FIG. 1C and FIG. 2, a memory card connector 10 comprises a housing 12, a shielding plate 14 mounted so as to cover an upper surface and right and left side surfaces of the housing 12, a locking mechanism 16 locking an inserted memory card 24, and a connector-pin holding part 18 formed unitarily with the housing 12. Each of the housing 12 and the plate 14 is formed in an inverse U-shape when seen from above. Positioning bosses 20 project on an undersurface of the housing 12.

Additionally, the memory card connector 10 includes a memory card insertion part 22 composed of a space formed by the housing 12 and the plate 14. The connector-pin holding part 18 is placed at a rear part of the housing 12, and is laid laterally across a back part inside the memory card insertion part 22. A plurality of connector pins (contact terminals) 26 are arranged laterally on the connector-pin holding part 18 so as to contact respective terminals of the memory card 24.

When the memory card 24 (indicated by a double dashed chain line in FIG. 1A and FIG. 1B) is inserted into the memory card insertion part 22 by being pressed in direction A, the memory card 24 is locked by the locking mechanism 16 placed at a right side of the memory card insertion part 22 in a state that the memory card 24 is electrically connected with the connector pins 26 of the connector-pin holding part 18.

In the memory card connector 10, data is written to or read from the memory card 24 in this mounting state. Upon retrieving the memory card 24, the memory card 24 is pressed again in direction A so as to be unlocked from the locking mechanism 16 and be ejected in direction B.

The locking mechanism 16 comprises a locking member 30, a slider (a sliding member) 32, an ejecting coil spring 34, and a locking pin 38. The locking member 30 engages the memory card 24 inserted in the memory card insertion part 22 so as to lock the memory card 24 at a predetermined mounting position. The slider 32 supports the locking member 30. The ejecting coil spring 34 energizes the slider 32 in direction B. The locking pin 38 locks the slider 32 at a mounting position by engaging a heart cam 36 formed in the slider 32.

Additionally, a pressing portion 40 is formed on the plate 14. The pressing portion 40 presses the locking pin 38. Further, an unlock guide portion 42 is formed inside the memory card insertion part 22. The unlocking guide portion 42 causes the locking member 30 to change position to an unlocking position according to a movement of the memory card 24.

A switch mechanism 50 is provided at a left side of the memory card insertion part 22 formed in the housing 12. This switch mechanism 50 comprises a card detection switch 52, a write-protect/card detection switch 54, and a write-protect switch 56.

Figures 3A, 3B:
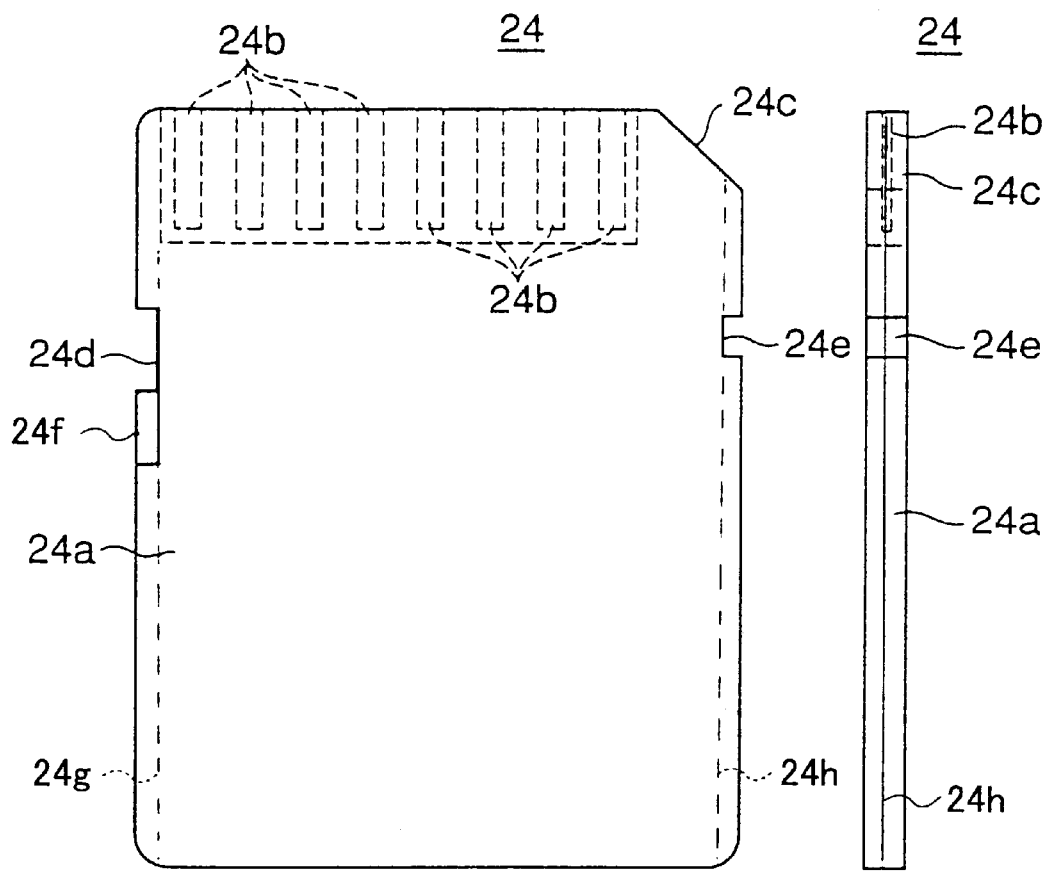
FIG. 3A is a plan view of a memory card.
FIG. 3B is a right side view of the memory card.
Figure 3C:
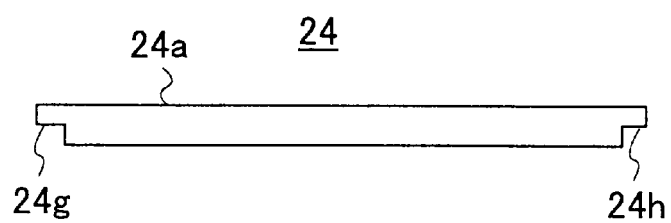
FIG. 3C is a front view of the memory card.

FIG. 3A to FIG. 3C illustrate a structure of the memory card 24. FIG. 3A is a plan view of the memory card 24. FIG. 3B is a right side view of the memory card 24. FIG. 3C is a front view of the memory card 24.

As shown in FIG. 3A to FIG. 3C, in the memory card 24, a semiconductor memory (not shown in the figure) is housed inside a case 24a having a thin-plate form, and a plurality of terminals 24b are mounted at an inserting end of the case 24a. These terminals 24b are arranged at intervals corresponding to intervals at which the connector pins 26 are arranged, and the terminals 24b are exposed only at an undersurface of the case 24a. Accordingly, the memory card 24 has to be inserted into the memory card connector 10 with the terminals 24b facing downward.

Additionally, an inclined portion 24c is provided at a right side of the front end (the inserting end) of the case 24a. The inclined portion 24c is used for detecting an inserting direction of the memory card 24. A write-protect receding portion 24d is provided at a left side of the case 24a. A locking recess 24e is provided at a right side of the case 24a. A write-protect member 24f capable of sliding is provided at the left side of the case 24a. When the write-protect member 24f is positioned downward so as to open the write-protect receding portion 24d, the memory card 24 is in a write-protect state. When the write-protect member 24f is positioned upward so as to close the write-protect receding portion 24d, the memory card 24 is in a writable state.

Further, in the memory card 24, slide portions 24g and 24h each formed in different levels are provided at both left and right sides of the case 24a so that these slide portions 24g and 24h are guided by guiding portions 41a and 41b of the memory card insertion part 22 so as to slide thereon. The slide portions 24g and 24h are loosely fit on the guiding portions 41a and 41b of the memory card insertion part 22 so that the memory card 24 can be smoothly inserted.

Figure 4:
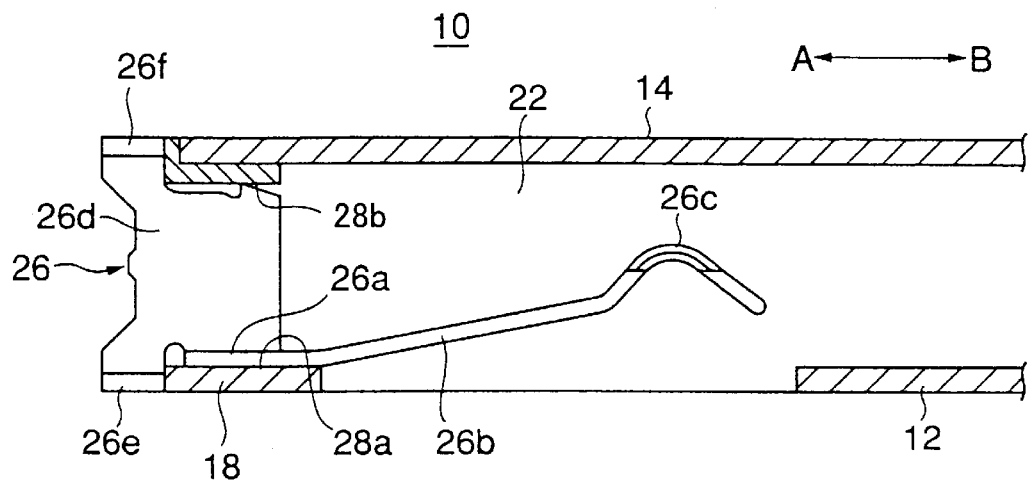
FIG. 4 is a longitudinal-sectional view showing a mounting state of a connector pin.
Figure 5A:
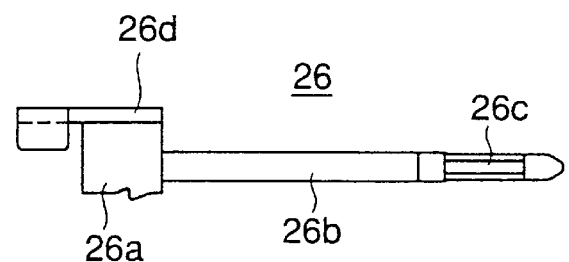
FIG. 5A is a plan view of the connector pin.
Figure 5C:
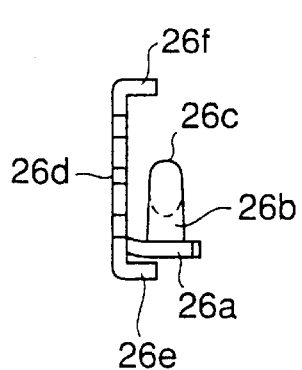
FIG. 5C is a rear view of the connector pin.
Figure 5B:
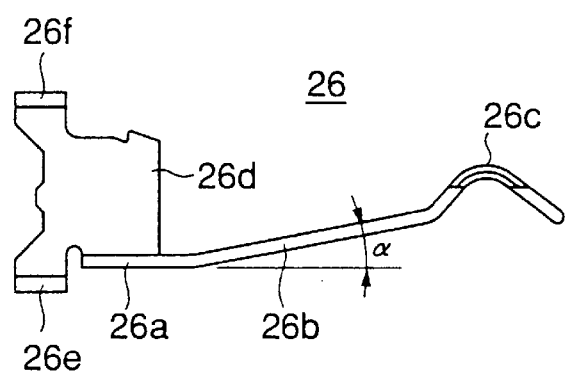
FIG. 5B is a side view of the connector pin.

FIG. 4 is a longitudinal-sectional view showing a mounting state of the connector pin 26. FIG. 5A to FIG. 5C illustrate a structure of the connector pin 26. FIG. 5A is a plan view of the connector pin 26. FIG. 5B is a side view of the connector pin 26. FIG. 5C is a rear view of the connector pin 26.

As shown in FIG. 4 and FIG. 5A to FIG. 5C, the connector pin 26 is composed of a conductive material, and comprises an engaging portion 26a, an arm portion 26b, a contact portion 26c, a connection portion 26d, a first terminal 26e, and a second terminal 26f. The engaging portion 26a engages an insertion hole 28a provided in the connector-pin holding part 18 of the housing 12, and extends horizontally. The arm portion 26b extends from the engaging portion 26a toward the memory card insertion part 22. The contact portion 26c is bent in a U-shape at an end of the arm portion 26b. The connection portion 26d projects from the engaging portion 26a toward a rear surface of the connector-pin holding part 18, and also engages an insertion hole 28b provided in the connector-pin holding part 18, and extends perpendicularly. The first terminal 26e is provided on a lower end of the connection portion 26d. The second terminal 26f is provided on an upper end of the connection portion 26d.

The arm portion 26b is so formed as to incline at an angle α with respect to the engaging portion 26a. When the memory card 24 is inserted into the memory card insertion part 22, the arm portion 26b bends downward so as to bring the contact portion 26c into contact with the terminal 24b of the memory card 24, and also presses the contact portion 26c against the terminal 24b of the memory card 24 with a spring force of the arm portion 26b so as to maintain a contact pressure therebetween.

The connection portion 26d is formed in a laid-down U-shape when seen in the rear view, whereon the first terminal 26e and the second terminal 26f each bent horizontally are positioned at heights forming same planes with under and upper surfaces, respectively, of the memory card connector 10. That is, the first terminal 26e and the second terminal 26f project toward a rear surface of the memory card connector 10, but do not project upward or downward from the memory card connector 10; thus, the first terminal 26e and the second terminal 26f are formed in conformity with a thinning-down of the memory card connector 10.

Figure 6:
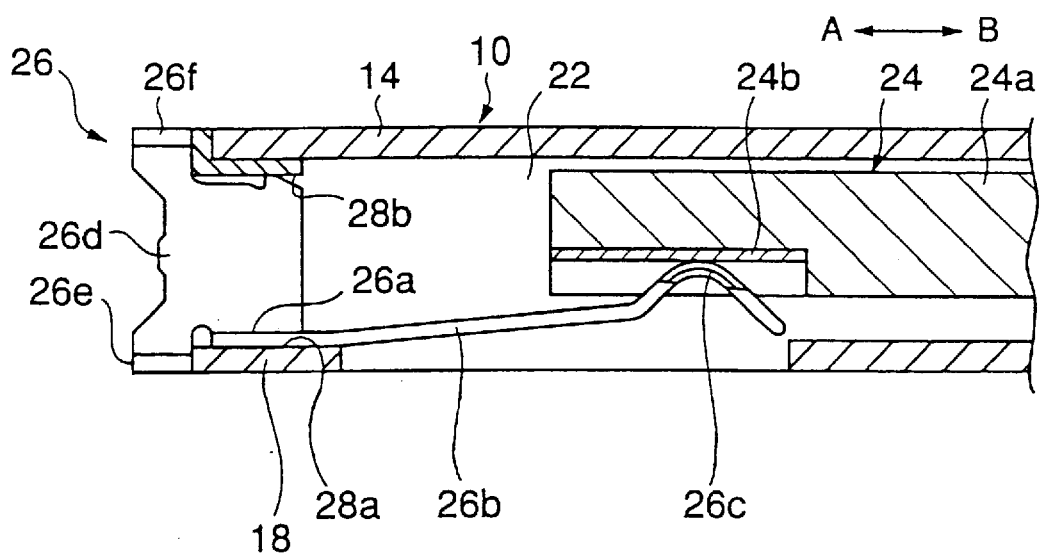
FIG. 6 is a longitudinal-sectional view showing a state where the memory card is inserted in the memory card connector.

FIG. 6 is a longitudinal-sectional view showing a state where the memory card 24 is inserted in the memory card connector 10.

As shown in FIG. 6, the memory card 24 is inserted in the memory card insertion part 22 of the memory card connector 10 with the terminals 24b facing downward. Thereby, the memory card 24 is held in the mounting state where the laterally arranged terminals 24b contact the contact portions 26c of the connector pins 26 so as to be electrically connected therewith.

Figures 7A, 7B:
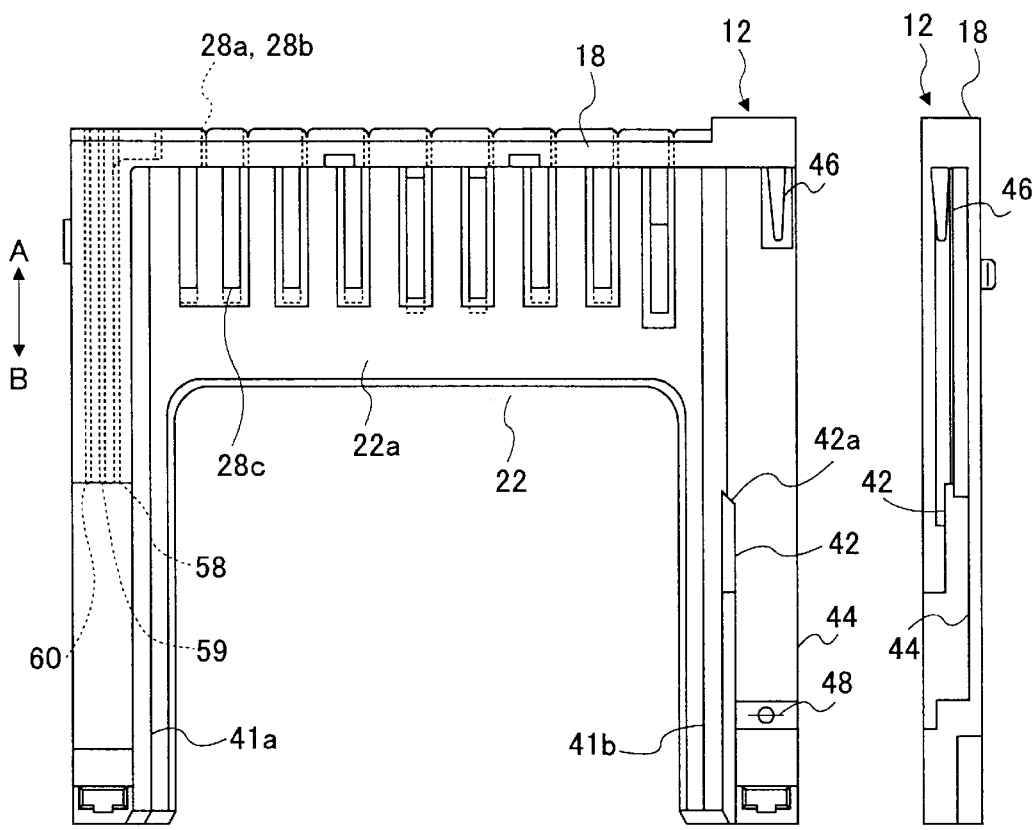
FIG. 7A is a plan view of a housing.
FIG. 7B is a right side view of the housing.
Figure 7C:
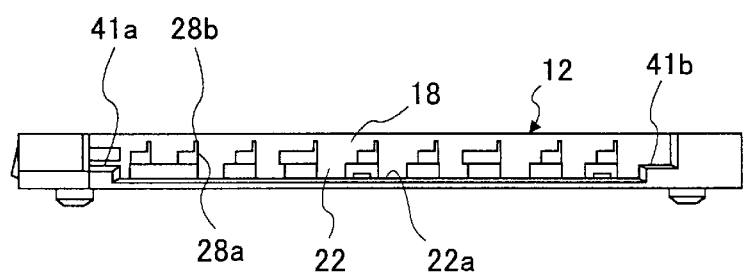
FIG. 7C is a front view of the housing.

FIG. 7A to FIG. 7C illustrate a structure of the housing 12. FIG. 7A is a plan view of the housing 12. FIG. 7B is a right side view of the housing 12. FIG. 7C is a front view of the housing 12.

As shown in FIG. 7A to FIG. 7C, the housing 12 is made of resin, and is formed unitarily, at a center of which the memory card insertion part 22 is formed, at the back part inside which the connector-pin holding part 18 holding the connector pins 26 is provided. In the connector-pin holding part 18, the insertion holes 28a and 28b for inserting the connector pins 26 are provided; in a plane portion 22a of the memory card insertion part 22, grooves 28c extending in direction A-B are formed so as to oppose the arm portions 26b of the connector pins 26.

At both left and right sides of the memory card insertion part 22 are formed the guiding portions 41a and 41b each having different levels so as to guide the slide portions 24g and 24h formed at both left and right sides of the memory card 24. Accordingly, the memory card 24 is inserted or ejected while being guided by sliding the slide portions 24g and 24h on the guiding portions 41a and 41b.

At the right side of the memory card insertion part 22 projects the unlock guide portion 42; at the right of the unlock guide portion 42 is formed a plane portion 44 for the slider 32 to slide on.

At a back part of the plane portion 44, a projection 46 projects in direction B so as to hold the coil spring 34 by being inserted into the coil spring 34. At a front part of the plane portion 44 is formed a small hole 48 into which one end 38a of the locking pin 38 bent in a laid-down U-shape is inserted. Accordingly, the locking pin 38 regulates or deregulates a sliding position of the slider 32 by swinging with the small hole 48 being a center of the swinging, and by engaging the other end with the heart cam 36.

The unlock guide portion 42 changes an operating position of the locking member 30 supported by the slider 32, according to the memory card 24 being inserted or ejected, and includes an inclined portion 42a that causes the locking member 30 to change position to a withdrawal position (the unlocking position) at which the locking member 30 is cleared from the memory card insertion part 22 until the memory card 24 reaches the mounting position, and that causes the locking member 30 to change position to a card locking position (a locking position) when the memory card 24 is inserted to the mounting position, as described hereinafter.

On the housing 12 are formed insertion grooves 58 to 60 (indicated by dashed lines in the figure) at the left side of the memory card insertion part 22. The card detection switch 52, the write-protect/card detection switch 54 and the write-protect switch 56 of the switch mechanism 50 are inserted into the insertion grooves 58 to 60.

Figure 8A:
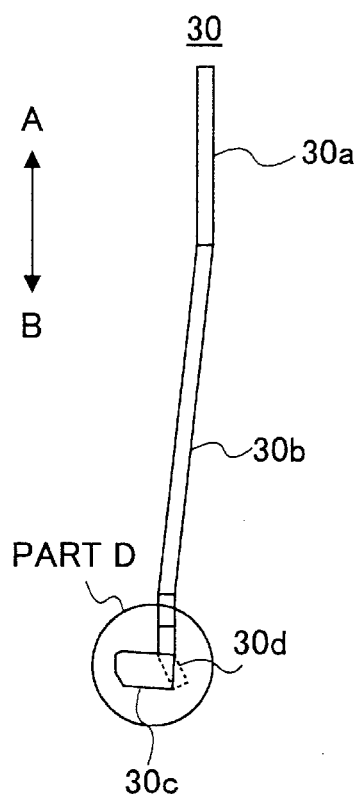
FIG. 8A is a plan view of a locking member.
Figure 8B:
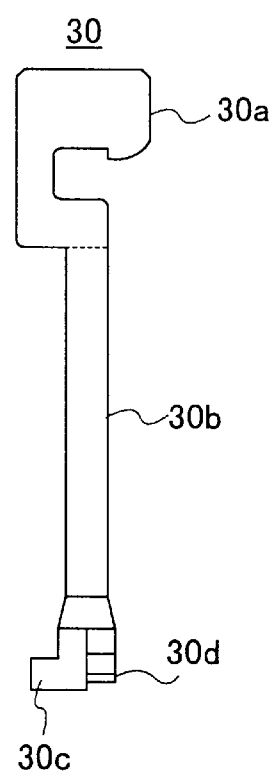
FIG. 8B is a right side view of the locking member.
Figure 8C:
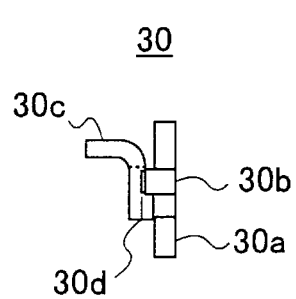
FIG. 8C is a front view of the locking member.
Figure 8D:
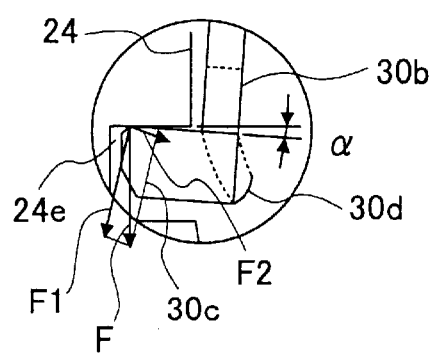
FIG. 8D is a magnification view of part D shown in FIG. 8A.

FIG. 8A to FIG. 8D illustrate a structure of the locking member 30. FIG. 8A is a plan view of the locking member 30. FIG. 8B is a right side view of the locking member 30. FIG. 8C is a front view of the locking member 30. FIG. 8D is a magnification view of part D shown in FIG. 8A.

As shown in FIG. 8A to FIG. 8C, the locking member 30 comprises a pressed-in portion 30a, a plate spring portion 30b, an engaging portion 30c and a projecting portion 30d. The pressed-in portion 30a is pressed into the housing 12. The plate spring portion 30b extends from the pressed-in portion 30a in direction B. The engaging portion 30c is bent leftward from an end of the plate spring portion 30b. The projecting portion 30d is inclined rightward below the engaging portion 30c so as to project therefrom.

Until the memory card 24 reaches the predetermined mounting position, the projecting portion 30d slides in contact with a side surface of the unlock guide portion 42 of the housing 12 so as to withdraw the engaging portion 30c toward the right side of the memory card insertion part 22. Accordingly, upon inserting the memory card 24 into the memory card insertion part 22, the engaging portion 30c does not contact the side of the memory card 24; thus, the memory card 24 is inserted smoothly, and is prevented from being damaged.

As shown in FIG. 8D, when the memory card 24 is inserted to the hereinafter-described mounting position, the engaging portion 30c of the locking member 30 engages the locking recess 24e of the memory card 24 by a pressing force of the plate spring portion 30b. At this point, the engaging portion 30c contacts on an engaged surface (a contact surface) of the locking recess 24e (shown in FIG. 3A) in a state that the engaging portion 30c is inclined by a predetermined angle (an angle α).

Thus, the engaging portion 30c contacts on the engaged surface of the locking recess 24e in the inclined state; accordingly, upon pulling out the memory card 24 mounted on the memory card insertion part 22 in direction B, an pressing force F acts on the engaging portion 30c in direction B.

However, a component force F1 (F1>F2) of the pressing force F in direction B does not act rightward so as to separate the engaging portion 30c from the locking recess 24e, but acts in the direction in which the plate spring portion 30b extends. Accordingly, even when a force pulling out in direction B acts on the memory card 24 in a locking state that the engaging portion 30c of the locking member 30 is engaged with the locking recess 24e, the engaging portion 30c does not separate from the locking recess 24e, and the locking state is maintained so as to prevent the memory card 24 from coming off or being pulled out.

Figure 9A:
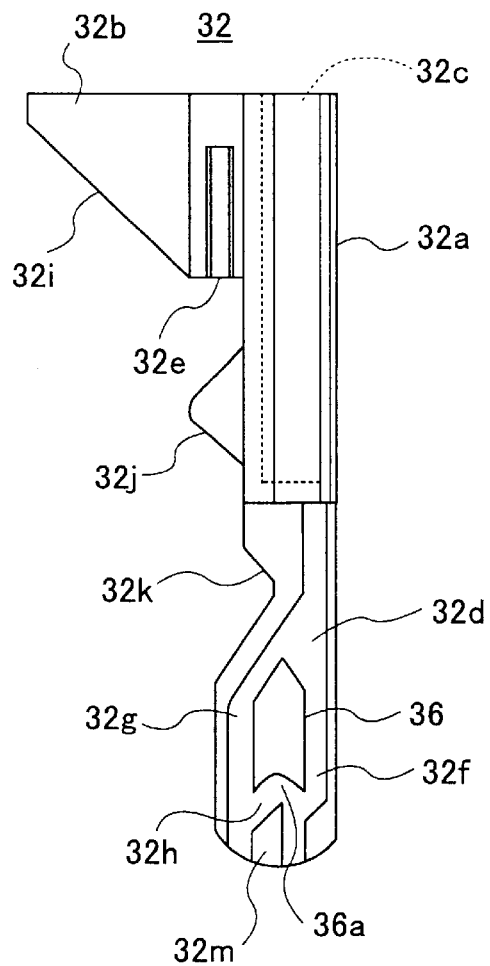
FIG. 9A is a plan view of a slider.
Figure 9B:
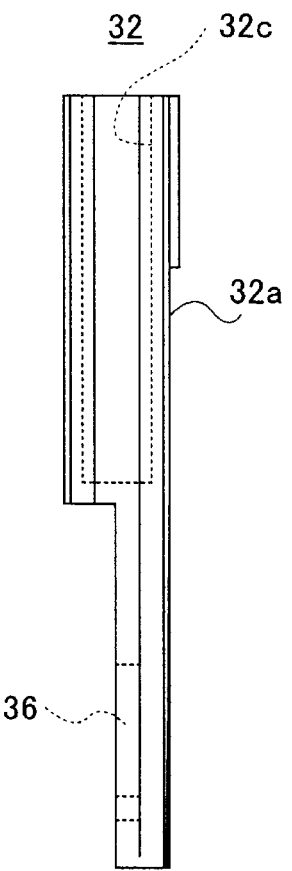
FIG. 9B is a right side view of the slider.
Figure 9C:
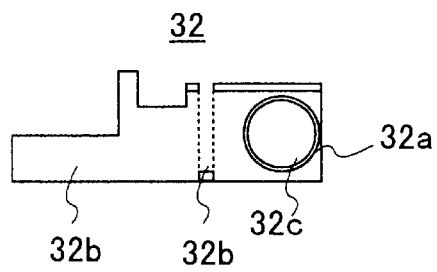
FIG. 9C is a rear view of the slider.

FIG. 9A to FIG. 9C illustrate a structure of the slider 32. FIG. 9A is a plan view of the slider 32. FIG. 9B is a right side view of the slider 32. FIG. 9C is a rear view of the slider 32.

As shown in FIG. 9A to FIG. 9C, the slider 32 comprises a slide portion 32a, a contact portion 32b, a spring insertion hole 32c, a cam groove 32d and a slit 32e. The slide portion 32a slides on the plane portion 44. The contact portion 32b has a triangular form projecting leftward from the slide portion 32a. An end portion of the coil spring 34 is inserted into the spring insertion hole 32c. The cam groove 32d is so formed as to surround the heart cam 36. The pressed-in portion 30a of the locking member 30 is pressed into the slit 32e.

The cam groove 32d is formed by an insertion-side path 32f, an ejection-side path 32g and a locking path 32h. The insertion-side path 32f is formed at a right side of the heart cam 36. The ejection-side path 32g is formed at a left side of the heart cam 36. The locking path 32h is adjacent to a receding portion 36a of the heart cam 36.

The other end 38b of the locking pin 38 is inserted into the cam groove 32d, and moves along the insertion-side path 32f or the ejection-side path 32g according to the memory card 24 being inserted or ejected so as to allow a sliding movement of the slider 32; further, when the memory card 24 is mounted, the other end 38b of the locking pin 38 comes to the locking path 32h, and contacts on the receding portion 36a of the heart cam 36 so as to regulate a returning movement of the slider 32.

Additionally, an inclined cam 32m is provided at a position opposing the receding portion 36a of the heart cam 36. The inclined cam 32m is inclined so as to turn the other end 38b of the locking pin 38 counterclockwise when the memory card 24 is pressed to a maximum pressed-in position so as to be ejected. This inclined cam 32m introduces the other end 38b of the locking pin 38 to the ejection-side path 32g formed at the left side of the heart cam 36, concurrently with an ejecting movement of the other end 38b of the locking pin 38 clearing from the receding portion 36a of the heart cam 36.

The contact portion 32b of the slider 32 projects toward the memory card insertion part 22, and includes an inclined portion 32i inclined at an angle corresponding to the inclined portion 24c of the memory card 24 (shown in FIG. 3A). Accordingly, when the memory card 24 is inserted into the memory card insertion part 22, the inclined portion 24c of the memory card 24 contacts on the inclined portion 32i of the slider 32 so that the slider 32 moves a distance by which the memory card 24 is inserted.

A card regulating portion 32j having a triangular form projects on a left side of the slide portion 32a. An inserting end of the memory card 24 may possibly jounce rightward or leftward when the inclined portion 24c of the memory card 24 contacts on the inclined portion 32i of the slider 32; therefor, the card regulating portion 32j slides in contact with the right side of the memory card 24 so as to prevent the inserting end of the memory card 24 from inclining rightward or leftward.

That is, the left side of the inserting end of the memory card 24 inserted into the memory card insertion part 22 is pressed rightward by an engaging portion 54e of the write-protect/card detection switch 54, and the right side thereof contacts on the card regulating portion 32j of the slider 32. Accordingly, the terminals 24b provided at the inserting end of the memory card 24 are inserted while positions thereof being regulated rightward or leftward so as to face the respective connector pins 26 of the memory card connector 10.

A receding portion 32k is provided at the left side of the slide portion 32a so that the slide portion 32a does not contact the projecting portion 30d of the locking member 30. Accordingly, even when the locking member 30 changes position in a direction clearing from the memory card 24 so as to unlock the memory card 24 as described hereinafter, the projecting portion 30d of the locking member 30 enters the receding portion 32k but does not contact the slide portion 32a, so that the slider 32 is prevented from being damaged.

Here, a description will be given of the switch mechanism 50.

Figure 10A:
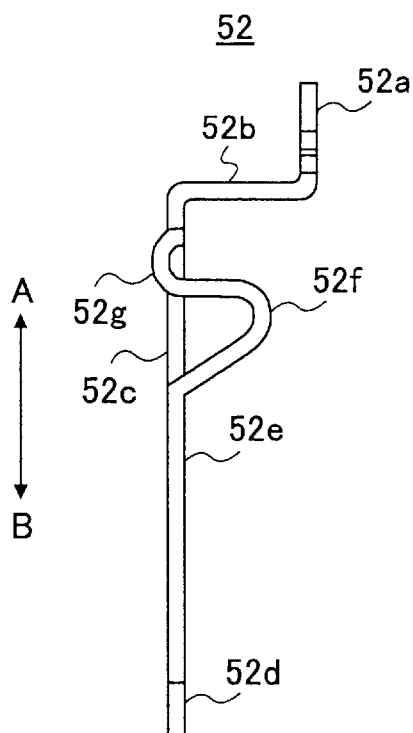
FIG. 10A is a plan view of a card detection switch.
Figure 10B:
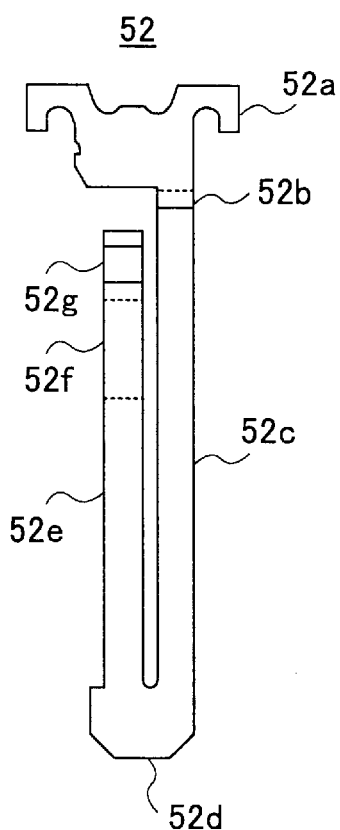
FIG. 10B is a right side view of the card detection switch.
Figure 10C:
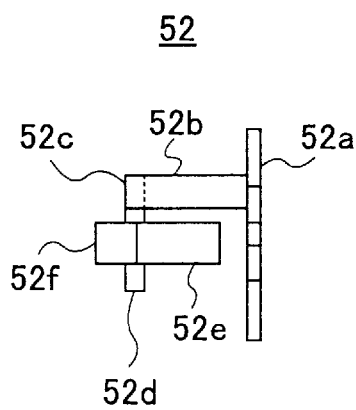
FIG. 10C is a rear view of the card detection switch.

FIG. 10A to FIG. 10C illustrate a structure of the card detection switch 52. FIG. 10A is a plan view of the card detection switch 52. FIG. 10B is a right side view of the card detection switch 52. FIG. 10C is a rear view of the card detection switch 52.

As shown in FIG. 10A to FIG. 10C, the card detection switch 52 is composed of a conductive material, and comprises a pressed-in portion 52a, a supporting portion 52b, a first arm portion 52c, a coupling portion 52d, a second arm portion 52e, a contact portion 52f, and a contact portion 52g. The pressed-in portion 52a is pressed into the connector-pin holding part 18. The supporting portion 52b is bent in a crank form from the pressed-in portion 52a. The first arm portion 52c extends from the supporting portion 52b in direction B. The coupling portion 52d is formed in a U-shape returning from an end of the first arm portion 52c in direction A. The second arm portion 52e extends from the coupling portion 52d in direction A. The contact portion 52f is bent at an end of the second arm portion 52e so as to project toward the memory card insertion part 22 (rightward). The contact portion 52g having a circular-arc form projects sideward (leftward) from an end of the contact portion 52f.

When the memory card 24 is inserted into the memory card insertion part 22 and reaches the mounting position, the contact portion 52f contacts on the left side of the memory card 24 so as to be pressed leftward. Thereby, the contact portion 52f supported on the second arm portion 52e is turned counterclockwise with the end of the first arm portion 52c functioning as a fulcrum.

Accordingly, the contact portion 52g projecting leftward from the end of the contact portion 52f contacts the adjacent write-protect/card detection switch 54 so as to be electrically connected therewith. Since the write-protect/card detection switch 54 is connected to a ground (an earth), the card detection switch 52 switches to an ON state so as to output a card detection signal.

Figure 11A:
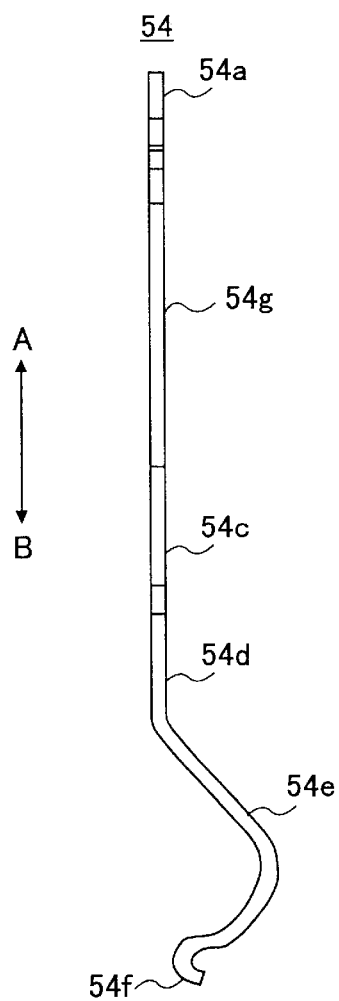
FIG. 11A is a plan view of a write-protect/card detection switch.
Figure 11B:
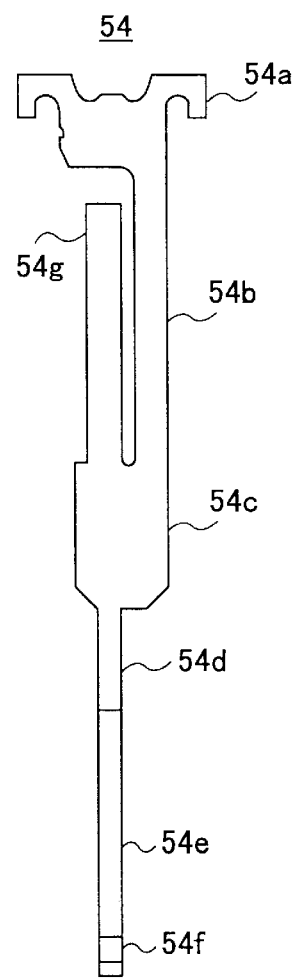
FIG. 11B is a right side view of the write-protect/card detection switch.
Figure 11C:
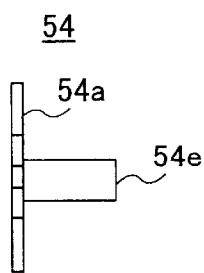
FIG. 11C is a rear view of the write-protect/card detection switch.

FIG. 11A to FIG. 11C illustrate a structure of the write-protect/card detection switch 54. FIG. 11A is a plan view of the write-protect/card detection switch 54. FIG. 11B is a right side view of the write-protect/card detection switch 54. FIG. 11C is a rear view of the write-protect/card detection switch 54.

As shown in FIG. 11A to FIG. 11C, the write-protect/card detection switch 54 is composed of a conductive material, and comprises a pressed-in portion 54a, a first arm portion 54b, a coupling portion 54c, a second arm portion 54d, the engaging portion 54e, a contact portion 54f, and a third arm portion 54g. The pressed-in portion 54a is pressed into the connector-pin holding part 18. The first arm portion 54b extends from the pressed-in portion 54a in direction B. The coupling portion 54c is provided at an end of the first arm portion 54b. The second arm portion 54d extends from the coupling portion 54c in direction B. The engaging portion 54e is bent at an end of the second arm portion 54d so as to project toward the memory card insertion part 22 (rightward). The contact portion 54f having a circular-arc form projects sideward (leftward) from an end of the engaging portion 54e. The third arm portion 54g extends from the coupling portion 54c in direction A.

When the memory card 24 is inserted into the memory card insertion part 22 and reaches the mounting position, the engaging portion 54e of the write-protect/card detection switch 54 engages the write-protect receding portion 24d (shown in FIG. 3A) formed at the left side of the memory card 24. Accordingly, the engaging portion 54e and the contact portion 54f change position toward the memory card insertion part 22 (rightward) so as to clear from the write-protect switch 56.

Figure 12A:
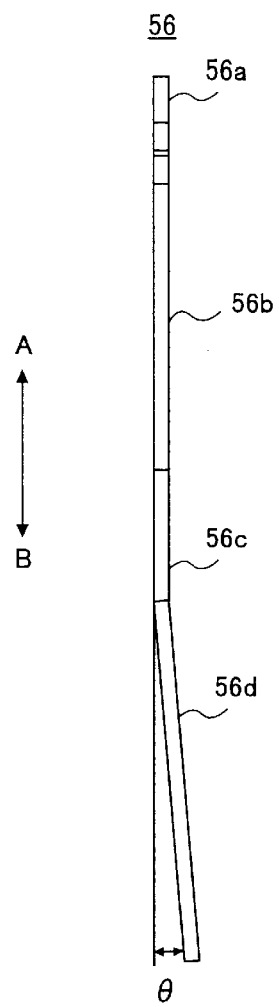
FIG. 12A is a plan view of a write-protect switch.
Figure 12B:
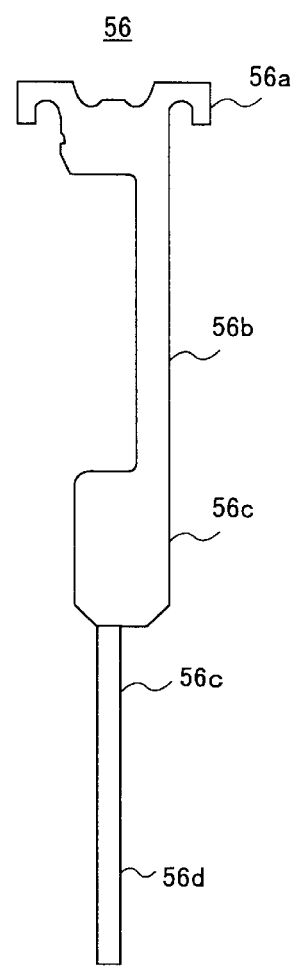
FIG. 12B is a right side view of the write-protect switch.
Figure 12C:
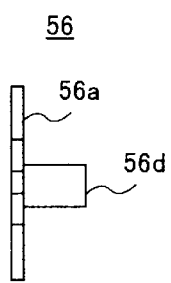
FIG. 12C is a rear view of the write-protect switch.

FIG. 12A to FIG. 12C illustrate a structure of the write-protect switch 56. FIG. 12A is a plan view of the write-protect switch 56. FIG. 12B is a right side view of the write-protect switch 56. FIG. 12C is a rear view of the write-protect switch 56.

As shown in FIG. 12A to FIG. 12C, the write-protect switch 56 is composed of a conductive material, and comprises a pressed-in portion 56a, a first arm portion 56b, a coupling portion 56c, and a contact portion 56d. The pressed-in portion 56a is pressed into the connector-pin holding part 18. The first arm portion 56b extends from the pressed-in portion 56a in direction B. The coupling portion 56c is provided at an end of the first arm portion 56b. The contact portion 56d is bent from the coupling portion 56c toward the memory card insertion part 22 (rightward) so as to incline at a predetermined angle (an angle θ).

The contact portion 56d of the write-protect switch 56 is provided at a position opposing the contact portion 54f of the adjacent write-protect/card detection switch 54. In the writable state where the write-protect receding portion 24d formed at the left side of the memory card 24 is closed by the write-protect member 24f (shown in FIG. 3A), the engaging portion 54e of the write-protect/card detection switch 54 contacts on the write-protect member 24f so as to change position leftward.

Thus, when the write-protect receding portion 24d is closed by the write-protect member 24f, the engaging portion 54e of the write-protect/card detection switch 54 moves leftward, and the contact portion 54f contacts the contact portion 56d of the write-protect switch 56 so as to be electrically connected therewith. Thereby, the write-protect switch 56 is turned on so as to output a writable-state indicating signal.

Since the card detection switch 52, the write-protect/card detection switch 54, and the write-protect switch 56 are closely provided at the left side of the memory card insertion part 22, the switch mechanism 50 can be provided in a small space in conformity with a downsizing and a thinning-down of the memory card connector 10.

Next, a description will be given, with reference to FIG. 2 and FIG. 13 to FIG. 19, of an inserting operation of the memory card 24 to the memory card connector 10 structured as described above, and an ejecting operation of the memory card 24.

(1) State Prior to Inserting the Memory Card (See FIG. 2)

In the memory card connector 10 before inserting the memory card 24 thereinto, the slider 32 is shifted in direction B by a pressing force of the ejecting coil spring 34, and the engaging portion 30c of the locking member 30 is withdrawn toward the right side of the memory card insertion part 22 by the unlock guide portion 42.

Figure 13:
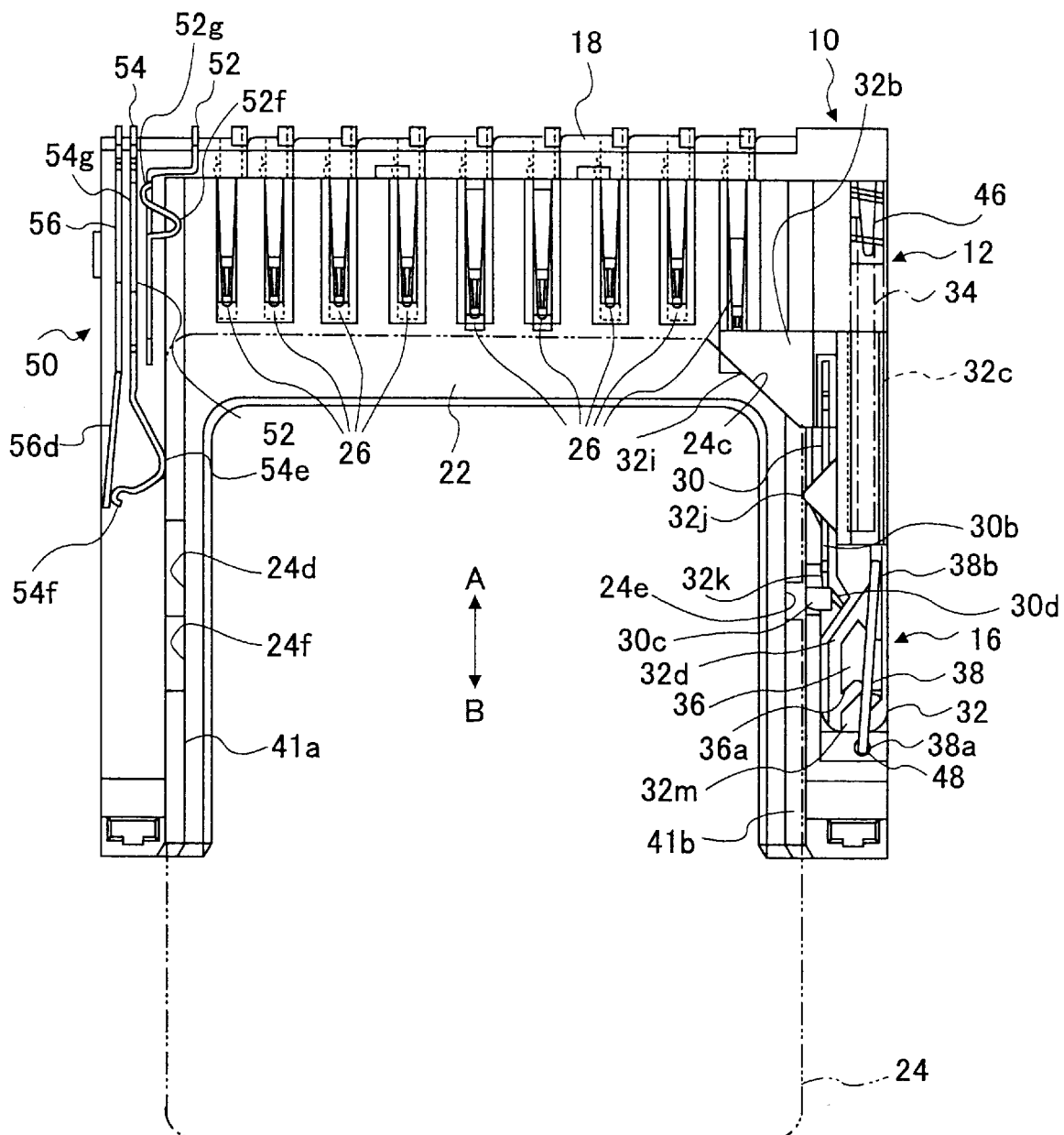
FIG. 13 is a plan view showing a memory card insertion state.

(2) Memory Card Insertion State (See FIG. 13)

When the memory card 24 is inserted into the memory card insertion part 22 of the memory card connector 10, the memory card 24 is guided in the inserting direction by the slide portions 24g and 24h at the left and right sides sliding on the guiding portions 41a and 41b of the memory card insertion part 22.

In addition, an inserting position of the memory card 24 is regulated sideward by the inclined portion 24c formed at the inserting end contacting an end of the card regulating portion 32j projecting from the left side of the slider 32 immediately before contacting on the contact portion 32b of the slider 32. Accordingly, the terminals 24b of the memory card 24 are regulated in position so as to face the respective connector pins 26 arranged laterally at the back part of the memory card insertion part 22.

Further, when the memory card 24 is inserted in the inserting direction (direction A), the inclined portion 24*c* formed at the inserting end contacts on the contact portion 32*b* of the slider 32. Thereby, the slider 32 moves in direction A together with the memory card 24.

In this course, the locking member 30 withdraws the engaging portion 30*c* toward the right side of the memory card insertion part 22 by the projecting portion 30*d* sliding in contact with the side surface of the unlock guide portion 42 of the housing 12. Accordingly, in the course of the memory card 24 being inserted into the memory card insertion part 22, the memory card 24 does not contact the engaging portion 30*c* of the locking member 30; thus, the memory card 24 is inserted smoothly, and is prevented from being damaged.

Additionally, since the left side of the inserting end of the memory card 24 contacts on the contact portion 52*f* of the card detection switch 52 so as to press the contact portion 52*f* leftward, the contact portion 52*g* projecting leftward at the end of the contact portion 52*f* contacts the adjacent write-protect/card detection switch 54 so as to output the card detection signal.

Figure 14:
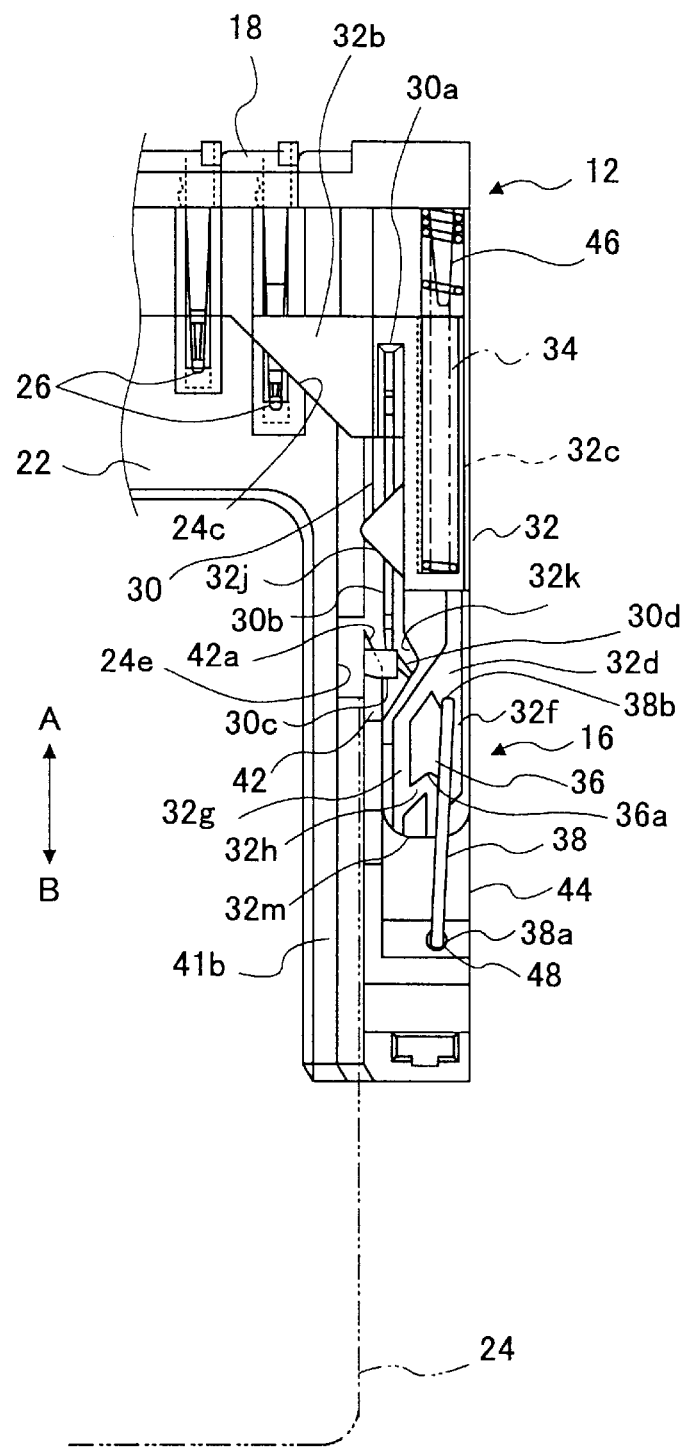
FIG. 14 is a first plan view for explaining an operation of a locking mechanism concurrent with a memory card inserting operation.

As shown in FIG. 14, when the memory card 24 is pressed further in the inserting direction (direction A), the projecting portion 30*d* of the locking member 30 slides in contact with the inclined portion 42*a* formed at an end of the unlock guide portion 42. Accordingly, the locking member 30 shifts gradually toward the memory card insertion part 22 in the course of the projecting portion 30*d* passing the inclined portion 42*a* of the unlock guide portion 42.

Concurrently, the other end 38*b* of the locking pin 38 moves to an entrance of the insertion-side path 32*f*.

Figure 15:
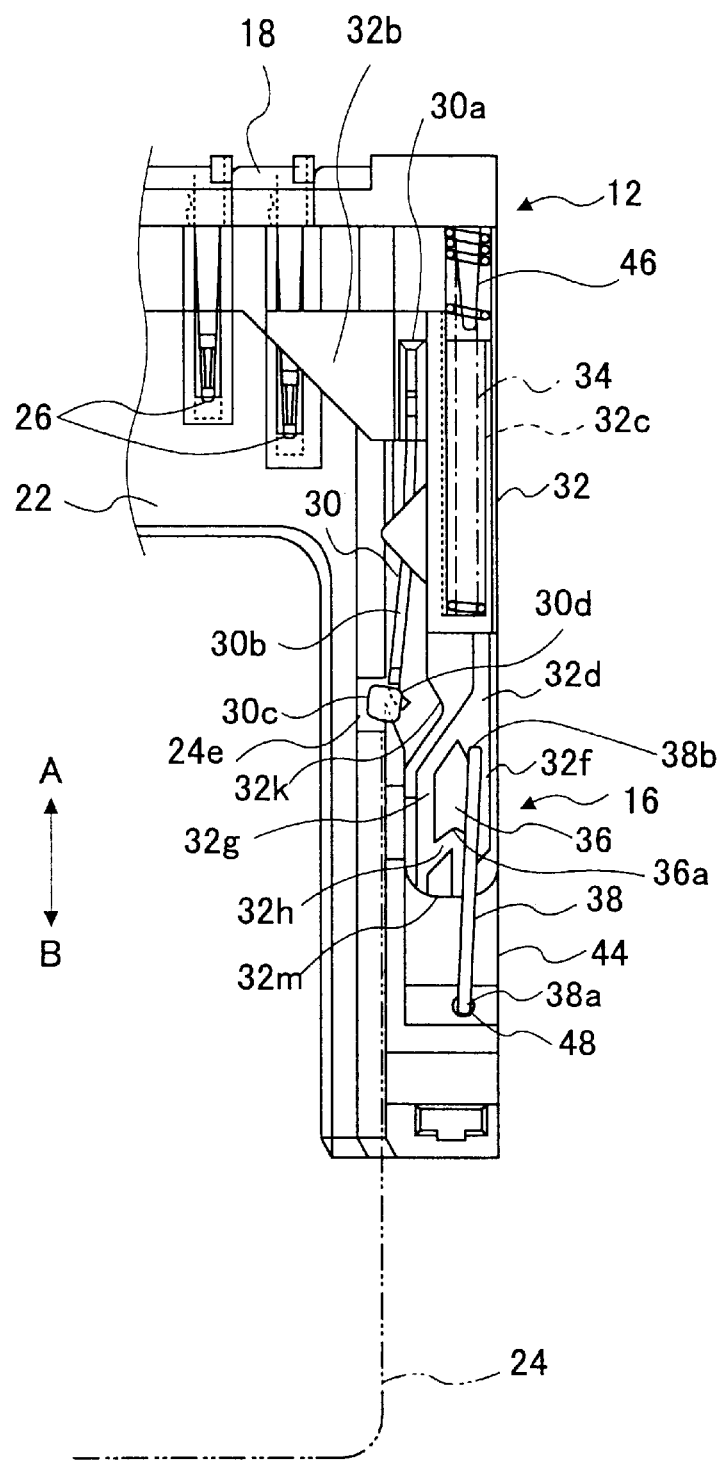
FIG. 15 is a second plan view for explaining the operation of the locking mechanism concurrent with the memory card inserting operation.

As shown in FIG. 15, when the memory card 24 is pressed further in the inserting direction (direction A), the memory card 24 reaches a position immediately before the mounting position. Thereupon, the locking member 30 is released from a regulation of the unlock guide portion 42 by the projecting portion 30*d* passing the inclined portion 42*a* formed at the end of the unlock guide portion 42. Consequently, the engaging portion 30*c* of the locking member 30 engages the locking recess 24*e* of the memory card 24.

Concurrently, the other end 38*b* of the locking pin 38 moves along the insertion-side path 32*f* formed at the right side of the heart cam 36.

Figure 16:
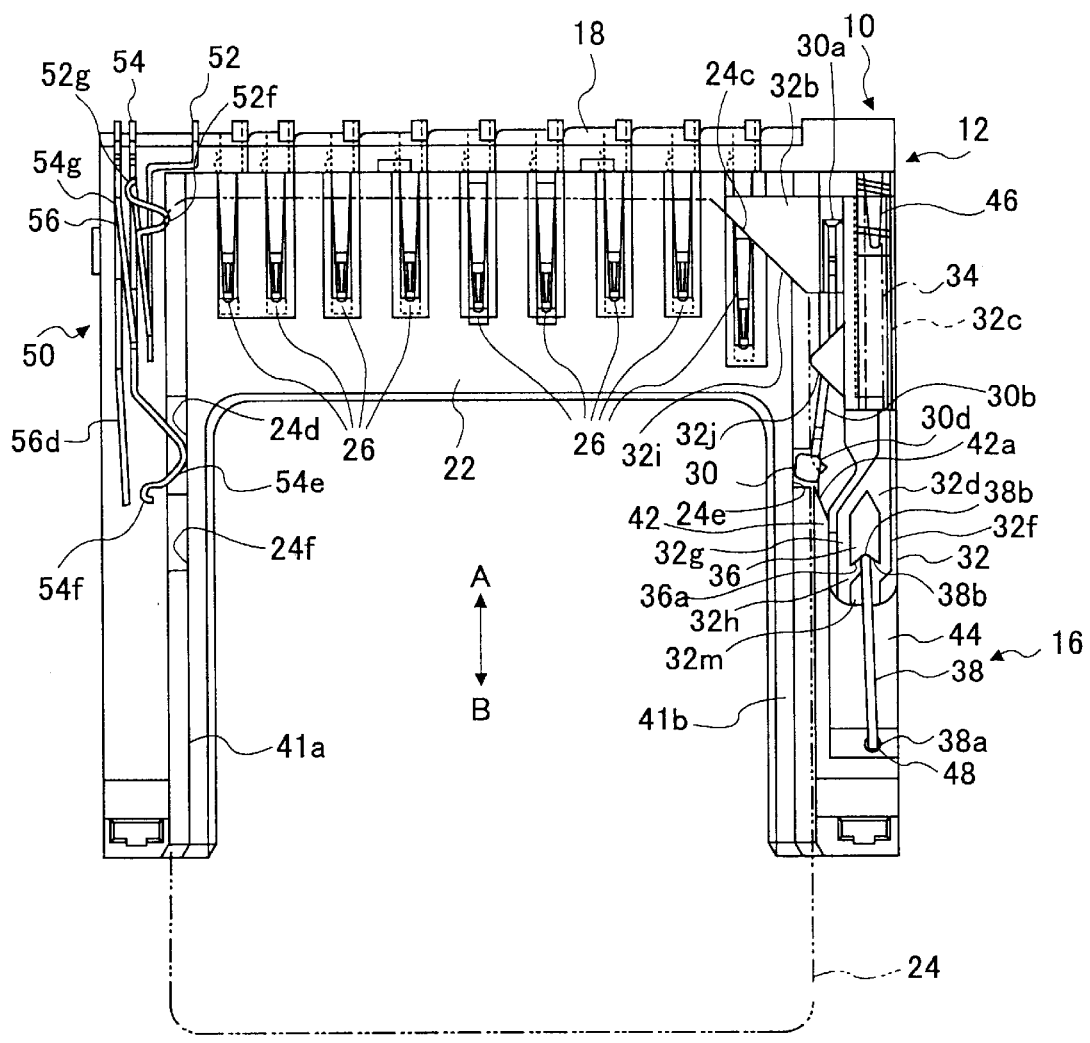
FIG. 16 is a plan view showing a memory card mount state.

(3) Memory Card Mount State (See FIG. 16)

As shown in FIG. 16 and FIG. 6, when the memory card 24 inserted into the memory card insertion part 22 reaches the mounting position, the terminals 24*b* of the memory card 24 contact the respective connector pins 26 of the memory card connector 10 so as to be electrically connected therewith.

Concurrently, the other end 38*b* of the locking pin 38 reaches the locking path 32*h* of the slider 32, and contacts on the receding portion 36*a* of the heart cam 36. The sideward swinging motion of the other end 38*b* of the locking pin 38 is regulated by the receding portion 36*a* of the heart cam 36, and the other end 38*b* of the locking pin 38 receives a spring force of the coil spring 34.

Thereby, the slider 32 is held in a state where the receding portion 36*a* of the heart cam 36 locks the locking pin 38. At the same time, the memory card 24 is locked at the mounting position via the locking member 30 supported by the slider 32.

As described above (see FIG. 8D), the engaging portion 30*c* of the locking member 30 engages the locking recess 24*e* of the memory card 24 by the pressing force of the plate spring portion 30*b*, and contacts on the engaged surface of the locking recess 24*e* in the state that the engaging portion 30*c* is inclined by the predetermined angle (the angle α).

Therefore, upon pulling out the memory card 24 mounted on the memory card insertion part 22 in direction B, the pressing force F acts on the engaging portion 30*c* in direction B, but does not act rightward so as to separate the engaging portion 30*c* from the locking recess 24*e*, and rather acts in the direction in which the plate spring portion 30*b* extends. Accordingly, the engaging portion 30*c* does not separate from the locking recess 24*e*, and the memory card 24 is maintained in the locking state, and is prevented from being pulled out.

In addition, when the memory card 24 is inserted in the mounting position, the contact portion 52*f* of the card detection switch 52 contacts on the left side of the memory card 24 so as to be pressed leftward; accordingly, the contact portion 52*g* projecting leftward from the end of the contact portion 52*f* contacts the adjacent write-protect/card detection switch 54 so as to output the card detection signal.

When the write-protect receding portion 24*d* (see FIG. 3A) of the memory card 24 is opened, the engaging portion 54*e* of the write-protect/card detection switch 54 engages the write-protect receding portion 24*d* (see FIG. 3A) of the memory card 24. Accordingly, the engaging portion 54*e* and the contact portion 54*f* change position toward the memory card insertion part 22 (rightward) so as to clear from the write-protect switch 56; thereby, the write-protect switch 56 switches to an OFF-state.

Figure 17:
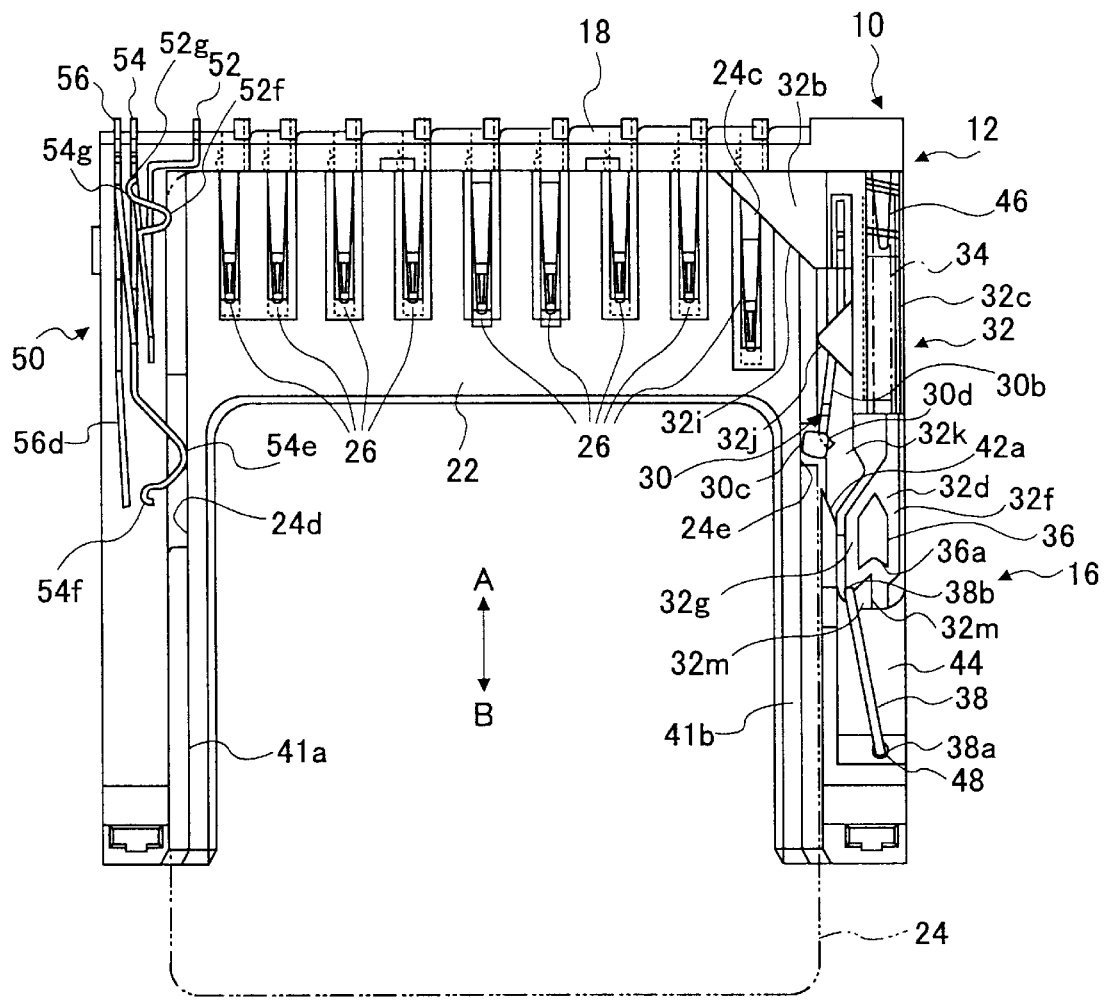
FIG. 17 is a plan view for explaining an ejecting operation.

(4) Ejecting Operation (See FIG. 17)

Upon ejecting the memory card 24 mounted on the memory card connector 10, the memory card 24 is pressed in the inserting direction (direction A) to the maximum pressed-in position.

Accordingly, the other end 38*b* of the locking pin 38 locked by the heart cam 36 of the slider 32 clears from the receding portion 36*a* of the heart cam 36, and turns counterclockwise along the inclined cam 32*m*. Thereby, the heart cam 36 and the locking pin 38 are unlocked so that the slider 32 can return in direction B.

Upon stopping pressing the memory card 24 in this state, the memory card 24 is ejected together with the slider 32 energized in direction B by the spring force of the coil spring 34.

As the slider 32 moves in direction B, the other end 38*b* of the locking pin 38 clears from the receding portion 36*a* of the heart cam 36, and slides in contact with the inclined cam 32*m* so as to move to the ejection-side path 32*g* formed at the left side of the heart cam 36. Thereby, the slider 32 slides in an ejecting direction (direction B), free from the regulation by the locking pin 38.

Figure 18:
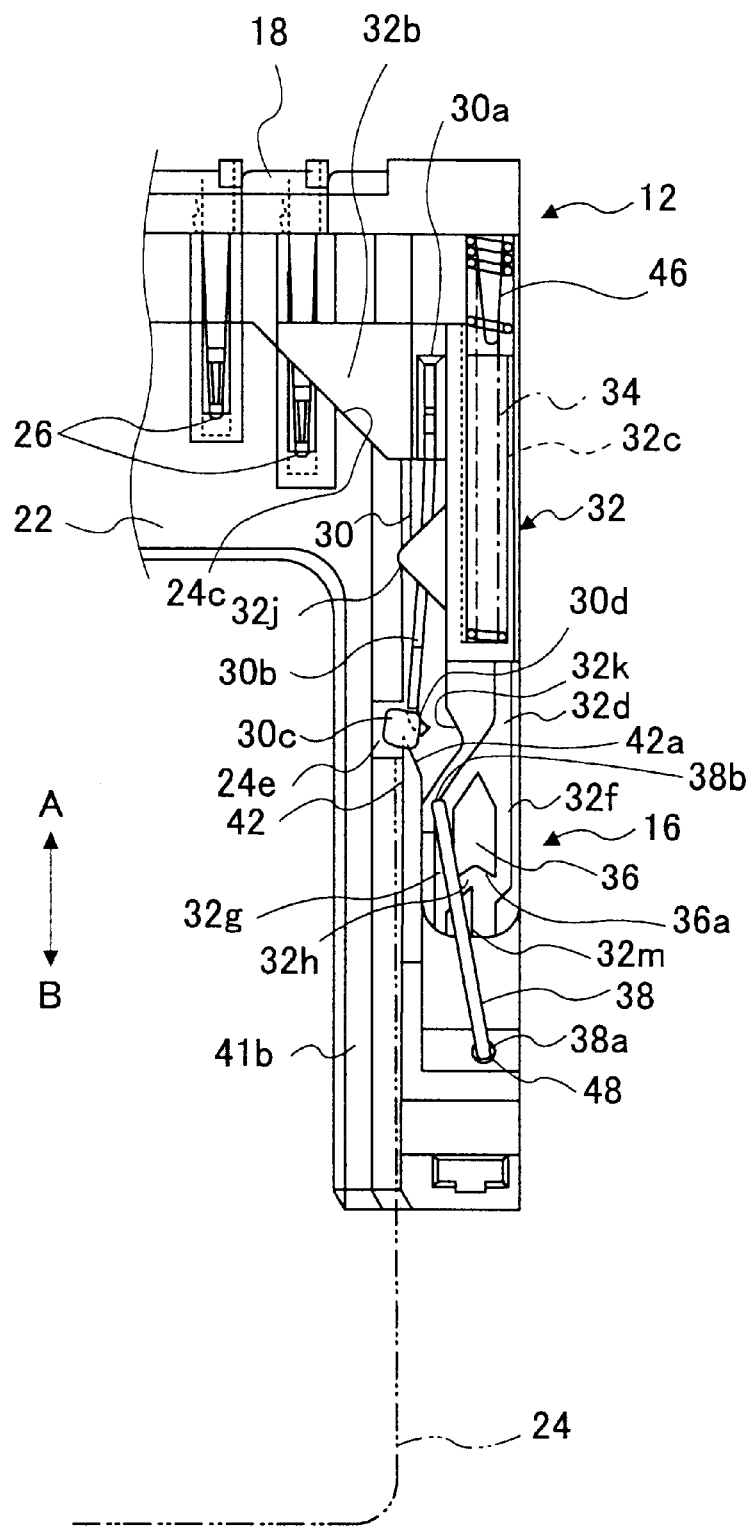
FIG. 18 is a first plan view for explaining an operation of the locking mechanism concurrent with the ejecting operation.

As shown in FIG. 18, in the course of the ejecting operation of the slider 32, the locking member 30 is pressed rightward from the memory card insertion part 22 by the projecting portion 30*d* contacting on the inclined portion 42*a* formed at the end of the unlock guide portion 42.

Figure 19:
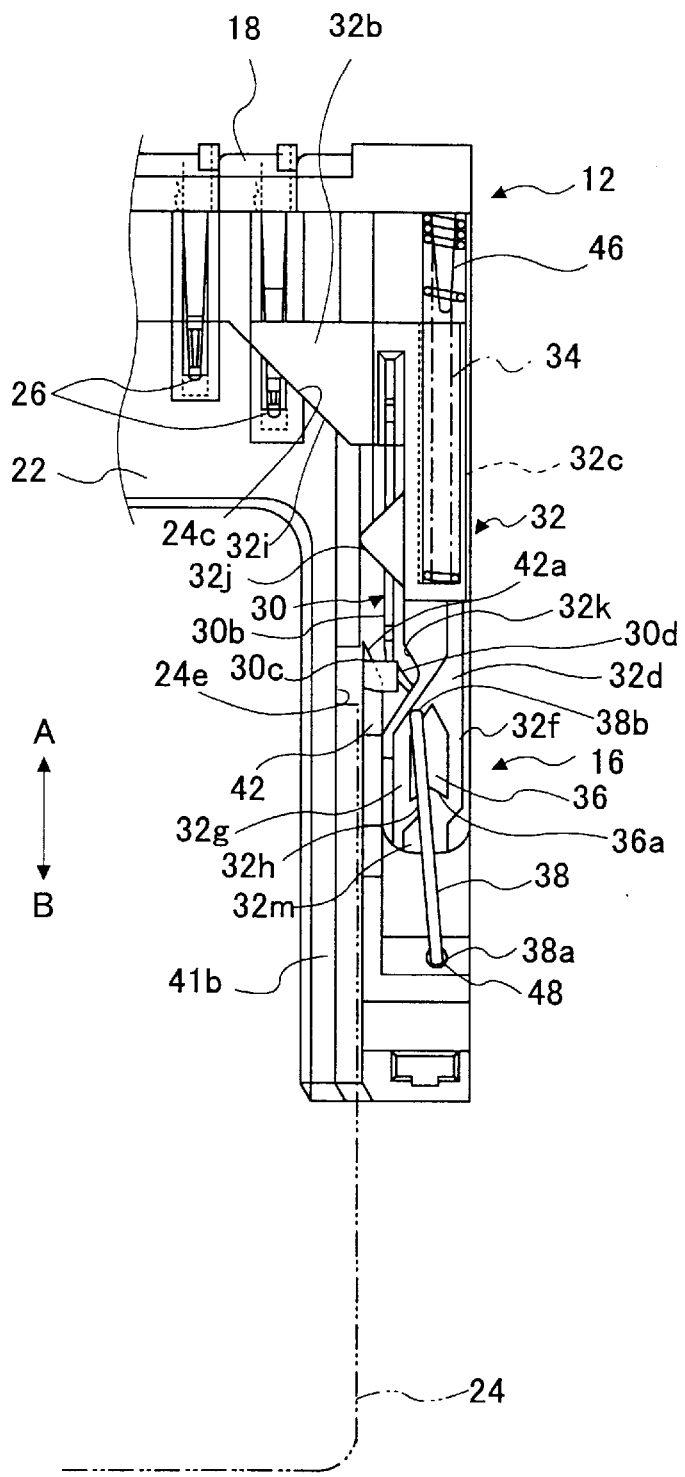
FIG. 19 is a second plan view for explaining the operation of the locking mechanism concurrent with the ejecting operation.

As shown in FIG. 19, as the slider 32 slides further in the ejecting direction (direction B), the projecting portion 30*d* of the locking member 30 slides along the inclined portion 42*a* formed at the end of the unlock guide portion 42 so as to shift in the direction clearing from the memory card 24.

Accordingly, after the memory card 24 and the slider 32 pass the mounting position, the engaging portion 30*c* of the locking member 30 changes position rightward so as to separate from the locking recess 24e of the memory card 24 and to unlock the memory card 24.

Thereafter, the memory card connector 10 and the memory card 24 come to an ejection state (same as the memory card insertion state shown in FIG. 13). Thereby, an operator can pull the memory card 24 out of the memory card connector 10 with ease.

Besides, although the foregoing embodiment is described by taking the memory card 24 having the shape shown in FIG. 3A to FIG. 3C as an example, the shape of the memory card is not limited thereto; and, the present invention is applicable to a memory card having other shapes than the shape shown in FIG. 3A to FIG. 3C.

Additionally, although the foregoing embodiment is described by taking the locking member 30 having the shape shown in FIG. 8A to FIG. 8D as an example, the shape of the locking member is not limited thereto; and, the locking member may have other shapes than the shape shown in FIG. 8A to FIG. 8D, if the locking member is so structured as to engage with or separate from the locking recess 24e formed at the side of the memory card 24.

The present invention is not limited to the specifically disclosed embodiments, and variations and modifications may be made without departing from the scope of the present invention.

The present application is based on Japanese priority application No. 2001-276784 filed on Sep. 12, 2001, the entire contents of which are hereby incorporated by reference.

What is claimed is:

1. A memory card connector comprising:

a housing forming an insertion part into which a memory card is inserted;

a contact terminal formed long in an inserting direction in said housing so as to contact a terminal of said memory card;

a locking mechanism locking said memory card at a predetermined mounting position by engaging with a side recess of said memory card when said memory card is inserted into said insertion part and reaches a vicinity of said mounting positions said locking mechanism including a locking member changing position to a locking position so as to engage with said side recess of said memory card when said memory card is inserted into said insertion part and reaches the vicinity of said mounting position;

a sliding member supporting said locking member so as to cause said locking member to engage with said side recess of said memory card, and including a contact portion contacting on an inserting end of said memory card so as to be pressed in the inserting direction, an engaging portion contacting on a contact surface of said side recess by so inclining with respect to said contact surface as to bite thereinto, and a plate spring portion causing said engaging portion to contact on said contact surface of said side recess by a pressing force.

2. The memory card connector as claimed in claim 1, wherein said housing comprises an unlocking guide portion causing said locking member to change position to an unlocking position according to a sliding movement of said sliding member by said memory card moving further in the inserting direction from said mounting position.

* * * * *